United States Patent
Horton et al.

(10) Patent No.: US 8,693,314 B1
(45) Date of Patent: Apr. 8, 2014

(54) SYSTEMS AND METHODS FOR PROTECTING BONDING GROUPS

(75) Inventors: Josh Matthew Horton, Madison, AL (US); Richard Paul King, Madison, AL (US)

(73) Assignee: ADTRAN, Inc., Huntsville, AL (US)

( * ) Notice: Subject to any disclaimer, the term of this patent is extended or adjusted under 35 U.S.C. 154(b) by 106 days.

(21) Appl. No.: 13/218,127

(22) Filed: Aug. 25, 2011

(51) Int. Cl.
  *H04L 1/22* (2006.01)

(52) U.S. Cl.
  USPC ........... 370/220; 370/216; 370/217; 370/218; 370/219; 370/252

(58) Field of Classification Search
  None
  See application file for complete search history.

(56) References Cited

U.S. PATENT DOCUMENTS

| | | | |
|---|---|---|---|
| 5,901,205 A | 5/1999 | Smith et al. | |
| 6,507,608 B1 | 1/2003 | Norrell | |
| 6,563,821 B1 | 5/2003 | Hong et al. | |
| 7,035,323 B1 | 4/2006 | Arato et al. | |
| 7,099,426 B1 | 8/2006 | Cory et al. | |
| 7,106,760 B1 | 9/2006 | Perumal et al. | |
| 7,295,639 B1 | 11/2007 | Cory | |
| 7,349,480 B2 | 3/2008 | Tsatsanis et al. | |
| 7,535,929 B2 | 5/2009 | Singhai et al. | |
| 7,570,662 B2 | 8/2009 | Chinnaiah et al. | |
| 7,573,834 B2 | 8/2009 | Liu et al. | |
| 7,639,596 B2 | 12/2009 | Cioffi | |
| 7,760,624 B1 * | 7/2010 | Goodson et al. | 370/228 |
| 2003/0048802 A1 | 3/2003 | Shenoi | |
| 2003/0091053 A1 | 5/2003 | Tzannes et al. | |
| 2004/0095881 A1 * | 5/2004 | Borella et al. | 370/219 |
| 2004/0109546 A1 | 6/2004 | Fishman | |
| 2005/0058186 A1 | 3/2005 | Kryzak et al. | |
| 2005/0066250 A1 * | 3/2005 | Coleman et al. | 714/752 |
| 2005/0123027 A1 * | 6/2005 | Cioffi et al. | 375/222 |
| 2006/0126505 A1 | 6/2006 | Derney et al. | |
| 2006/0126660 A1 | 6/2006 | Denney et al. | |
| 2006/0215689 A1 * | 9/2006 | Liu et al. | 370/465 |
| 2007/0058655 A1 | 3/2007 | Myers | |
| 2007/0097907 A1 | 5/2007 | Cummings | |
| 2007/0140286 A1 * | 6/2007 | Kraus | 370/419 |
| 2007/0160040 A1 | 7/2007 | Kwon | |
| 2009/0135850 A1 | 5/2009 | Hong et al. | |

* cited by examiner

*Primary Examiner* — Otis L Thompson, Jr.
*Assistant Examiner* — Rina Pancholi
(74) *Attorney, Agent, or Firm* — Maynard, Cooper & Gale, P.C.; Jon E. Holland (57) ABSTRACT

A communication system comprises a plurality of subscriber lines that are bonded to provide a bonding group, referred to as the "primary bonding group." A data stream comprising a plurality of data packets is transmitted to a port, referred to as the "primary port," of a network termination unit (NTU) coupled to each subscriber line of the primary bonding group, and a bonding engine of the NTU fragments the data packets for transmission across the bonding group. Logic, referred to as "link state awareness (LSA) logic," is configured to monitor at least one communication parameter indicative of the communication performance of the bonding group. If the measured communication performance is within a specified range, the LSA logic disables the primary port. Such action signals a switching element to switch communication to another NTU that is coupled to one or more other subscriber lines for backing up the primary bonding group. Thus, communication is switched to a backup channel based on the measured performance parameter before a complete failure of the primary bonding group occurs.

22 Claims, 4 Drawing Sheets

SYSTEMS AND METHODS FOR PROTECTING BONDING GROUPS

RELATED ART

Bonding is a technique used to effectively combine a plurality of data channels in order to provide an aggregated data rate that is higher than the data rate provided by any single one of the channels. In this regard, a bonding engine can be used to bond a plurality of data channels so that all of the bonded channels, referred to as a "bonding group," can be used to transmit a data stream, thereby providing a relatively high data rate for the data stream. Such techniques have been employed to bond a plurality of subscriber lines extending between a network facility and a customer premises in order to increase the data rate provided to the customer premises.

When subscriber lines are bonded to form a bonding group, a bonding engine of a transmission system receives a stream of data packets to be transmitted to a remote receive system, and the bonding engine fragments each packet into a plurality of fragments for transmission to the receive system across the bonding group. Each fragment of the same data packet is transmitted across a respective subscriber line, and a bonding engine at the receive system reassembles the fragments into the data packet originally fragmented by the bonding engine at the transmission system. By performing such techniques for each data packet, the data stream is transmitted across the bonding group at a higher data rate than is possible by transmitting the data stream across only one of the subscriber lines.

In some cases, the communication occurring across a subscriber line of a bonding group can become impaired due to line anomalies or other communication problems such that the subscriber line is unable, at least temporarily, to transmit data. As used herein, an "active" subscriber line refers to a subscriber line currently capable of communicating data, and an "inactive" subscriber line refers to a subscriber line that is currently unable to communicate data due to a line impairment or some other communication problem (e.g., a failure of a transceiver at one end of the subscriber line). As more subscriber lines of a bonding group become inactive, the aggregate data rate provided by the bonding group decreases.

If all of the subscriber lines of a bonding group become inactive, then the bonding group is unable to communicate any data. In such case, if there is a backup data channel available, communication is switched from the bonding group to the backup channel. The use of such a backup channel helps to enhance the resiliency and robustness of the network by enabling communication during failure of the bonding group, but providing such a backup channel requires the network service provider to maintain at least one subscriber line for the backup channel separate from the lines used for the bonding group. Often the subscriber line or lines of the backup channel are idle while the bonding group is up and running. Thus, the network service provider incurs the cost of the subscriber line or lines for the backup channel while realizing a benefit only when there is a communication problem with the bonding group. Accordingly, the backup channel is often designed to provide a limited bandwidth in an attempt to minimize the resources usurped by the backup channel.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

The present disclosure pertains to systems and methods for protecting bonding groups. One exemplary embodiment of a communication system comprises a plurality of subscriber lines that are bonded to provide a bonding group, referred to as the "primary bonding group." A data stream comprising a plurality of data packets is transmitted to a port, referred to as the "primary port," of a network termination unit (NTU) coupled to each subscriber line of the primary bonding group, and a bonding engine of the NTU fragments the data packets for transmission across the bonding group. Logic, referred to as "link state awareness (LSA) logic," is configured to monitor at least one communication parameter indicative of the communication performance of the bonding group. If the measured communication performance falls below a threshold level or otherwise is within a specified range, the LSA logic disables the primary port. Such action signals a switching element to switch communication to another NTU that is coupled to one or more other subscriber lines for backing up the primary bonding group. Thus, communication is switched to a backup channel based on the measured performance parameter before a complete failure of the primary bonding group occurs.

Figure 1:
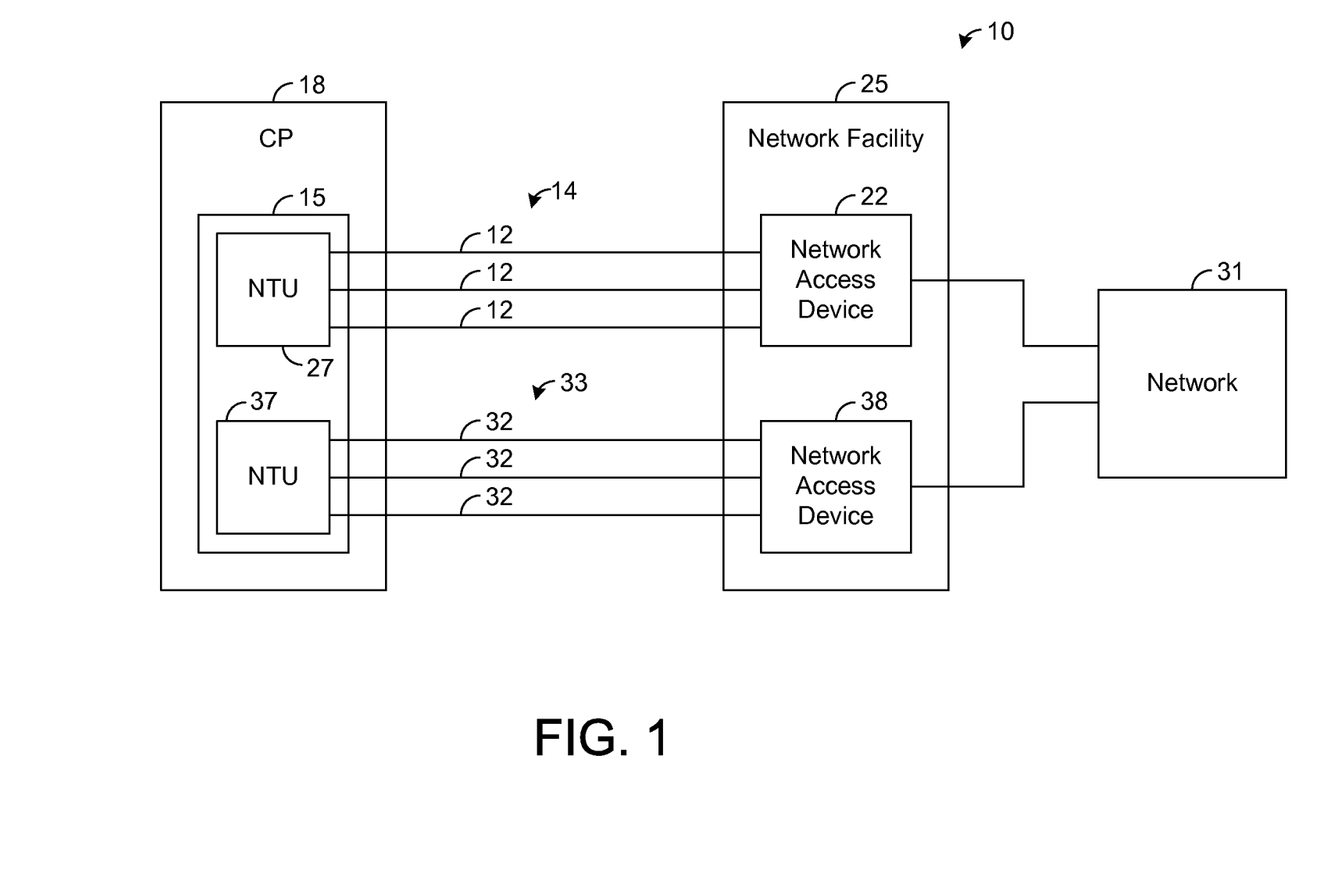
FIG. 1 is a block diagram illustrating an exemplary embodiment of a communication system.

FIG. 1 depicts an exemplary embodiment of a communication system 10 that uses a plurality of bonded subscriber lines 12, referred to collectively hereafter as "primary bonding group 14," to communicate between customer premises equipment (CPE) 15 at a customer premises (CP) 18 and a network access device 22 at a network facility 25, such as a central office. In one exemplary embodiment, each subscriber line 12 comprises a twisted-wire pair, which has a pair of conductive connections twisted together, but other types of subscriber lines may be used in other embodiments. At the CP 18, each subscriber line 12 is terminated by a network termination unit (NTU) 27 of the CPE 15, and each subscriber line 12 is terminated by the network access device 22 at the network facility 25.

In the upstream direction, data packets of a data stream are fragmented by the NTU 27 and transmitted across the primary bonding group 14 to the network access device 22, which reassembles the fragments to recover the data stream. The recovered data stream is then forwarded to a network 31, such as the public switched telephone network (PSTN) or other communication network. In the downstream direction, data packets from the network 31 destined for the CPE 15 are received by the network access device 22, which fragments the data packets and transmits the fragments across the primary bonding group 14 to the NTU 27. Note that, in the exemplary embodiment shown by FIG. 1, the primary bonding group 14 has three subscriber lines 12. In other embodiments, the number of subscriber lines 12 may be different.

The system 10 also has a plurality of bonded subscriber lines 32, referred to collectively hereafter as "backup bonding group 33," that form a backup channel for the primary bonding group 14. At the CP 18, each subscriber line 32 of the backup bonding group 33 is terminated by an NTU 37 of the CPE 15, and each subscriber line 32 is also terminated by a network access device 38 at the network facility 25. As will be described in more detail hereafter, when a measured parameter indicative of the communication performance of the primary bonding group 14 falls below a threshold level, communication is switched from the primary bonding group 14 to the backup bonding group 33. In this regard, the upstream packets transmitted by the CPE 15 to the network access device 22 are switched so that they are communicated across the backup bonding group 33 instead of the primary bonding group 14. Similarly, the downstream packets transmitted by the network access device 22 to the CPE 15 are switched so that they are communicated across the backup bonding group 33 instead of the primary bonding group 14.

Note that FIG. 1 shows the backup data channel comprising a bonded set of subscriber lines 32, but in other embodiments, it is unnecessary for bonding to be used for the backup channel. As an example, the backup channel may be defined by a single subscriber line 32 in which case the maximum data rate afforded by the backup channel may be less than the maximum data rate of the primary bonding group 14. The backup channel may comprise any number of subscriber lines 32 in other embodiments. In addition, it is unnecessary for the network service provider to provide both network access devices 22 and 38 or for each network access device 22 and 38 to communicate with the same network 31. Further, it is also unnecessary for the network access devices 22 and 38 to be located at the same network facility 25.

Figure 2:
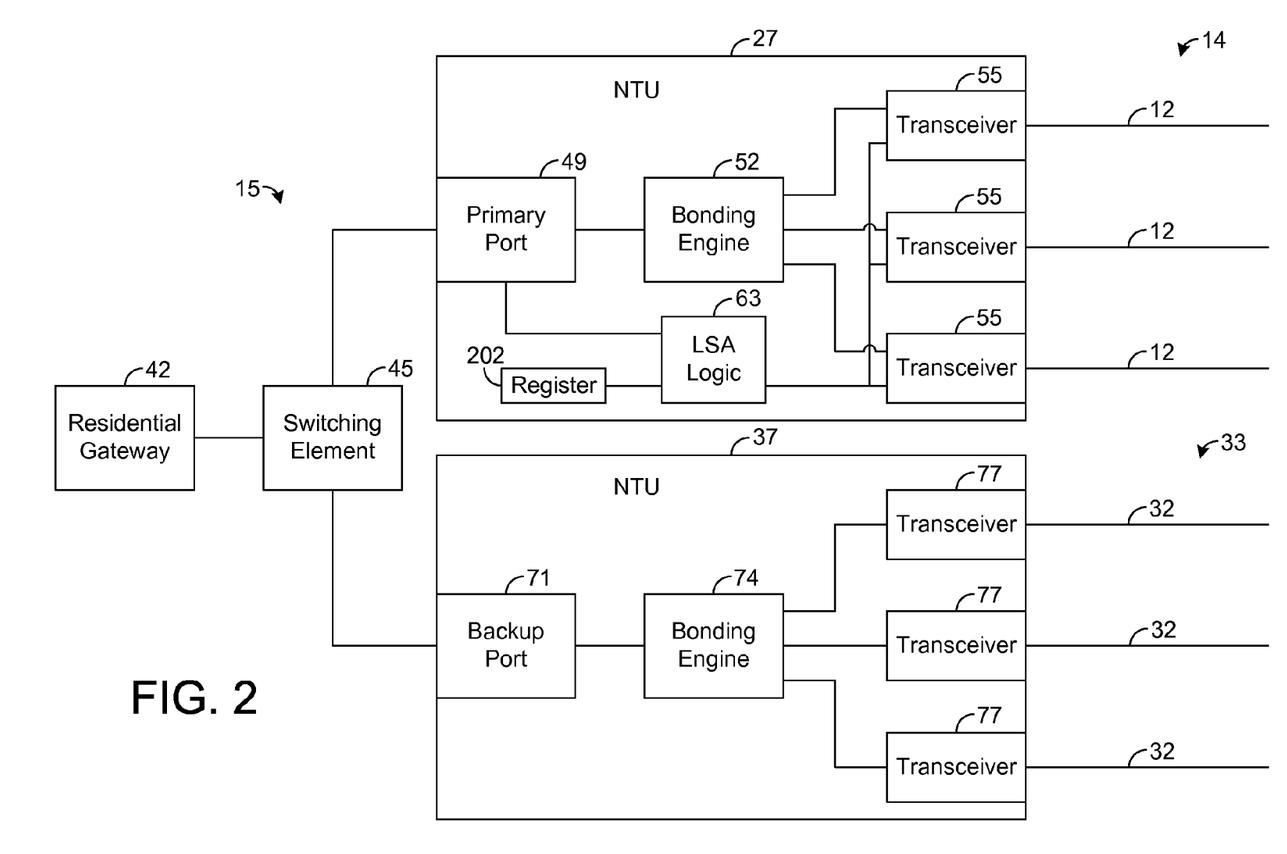
FIG. 2 is a block diagram illustrating an exemplary embodiment of customer premises equipment, such as is depicted by FIG. 1.

FIG. 2 depicts an exemplary embodiment of the CPE 15. The CPE 15 comprises a residential gateway 42 that communicates with various devices at the CP 18, such as computers, telephones, facsimile machines, and/or other devices. The residential gateway 42 is coupled to a switching element 45, such as an Ethernet switch, that receives a data stream for transmission to the network 31 (FIG. 1). Such data stream comprises a plurality of data packets, which are forwarded by the switching element 45 to a port 49, referred to hereafter as "primary port," of the NTU 27. In one exemplary embodiment, the primary port 49 is an Ethernet port, and the data packets forwarded to such port 49 are in accordance with Ethernet protocols. In other embodiments, other types of ports and protocols may be used. The primary port 49 is coupled to a bonding engine 52 and transmits the data packets from the switching element 45 to the bonding engine 52, which is configured to fragment the data packets for transmission across the primary bonding group 14, as will be described in more detail hereafter.

The bonding engine 52 is coupled to a plurality of transceivers 55, which are respectively coupled to the subscriber lines 12. In one exemplary embodiment, the transceivers 55 communicate across the subscriber lines 12 according to digital subscriber line (DSL) modulation formats, such as asymmetric DSL (ADSL), high-bit-rate DSL, (HDSL), very-high-bit-rate DSL (VDSL), or other types of DSL formats, but modulation formats other than DSL may be employed in other embodiments.

For each data packet received by the bonding engine 52 from the switching element 45, the bonding engine 52 is configured to fragment the packet into a plurality of fragments and to then forward the fragments to a plurality of transceivers 55 such that each fragment is received by a different transceiver 55. Each transceiver 55 receiving a fragment modulates a carrier signal with the fragment to form a modulated signal that is transmitted across the subscriber line 12 coupled to such transceiver 55. Thus, each fragment is communicated across a respective subscriber line 12, and a plurality of the subscriber lines 12 carry the fragments of the same packet.

In the downstream direction, the signals received by the transceivers 55 from the subscriber lines 12 carry fragments of data packets fragmented by the network access device 22 (FIG. 1). The transceivers 55 demodulate such signals and transmit the fragments to the bonding engine 52, which reassembles the fragments to recover the data packets originally fragmented by the network access device 22. The bonding engine 52 transmits the recovered data packets to the primary port 49, which forwards the data packets to the switching element 45. The switching element 45 transmits such data packets to the residential gateway 42, which forwards the data packets to the CP devices (not shown), as appropriate based on the packet headers.

The NTU 27 further comprises logic 63, referred to hereafter as "link state awareness (LSA) logic," that is configured to monitor the communication occurring across the primary bonding group 14 and to determine when the communication performance of the bonding group 14 falls below a threshold level or otherwise is within a specified range. When the LSA logic 63 determines that such communication performance has fallen below the threshold level or is otherwise within the specified range, the LSA logic 63 is configured to disable the primary port 49 such that data packets cannot be communicated through the port 49.

In this regard, when the primary port 49 is enabled by the LSA logic 63, it is configured to pass data packets between the switching element 45 and the bonding engine 52, as described herein, and the primary port 49 is also configured to transmit to the switching element 45 from time-to-time (e.g., periodically) a carrier pulse, referred to hereafter as a "heartbeat pulse." When the primary port 49 is disabled by the LSA logic 63, it stops passing data packets and also stops transmitting heartbeat pulses. Thus, if the primary port 49 receives a data packet from either the bonding engine 52 or the switching element 45 when it is disabled, the primary port 49 drops the data packet. Accordingly, when the primary port 49 is disabled, no data is output to either the bonding engine 52 or the switching element 45, and the switching element 45 stops receiving heartbeat pulses from the primary port 49. As will be described in more detail hereafter, if the switching element 45 stops receiving heartbeat pulses for a specified period of time, the switching element 45 determines that communication with the NTU 27 has been lost and initiates a backup switch from the primary bonding group 14 to the backup bonding group 33.

In one exemplary embodiment, the LSA logic 63 is configured to transmit a control signal for selectively enabling the primary port 49. In one exemplary embodiment, the control signal is a one-bit digital signal that enables the primary port 49 when asserted and disables the primary port 49 when deasserted, but other types of control signals may be used in other embodiments.

In one exemplary embodiment, a performance threshold for the bonding group 14 is established such that the LSA logic 63 disables the primary port 49 based on the performance threshold even though one or more of the subscriber lines 12 are active and, thus, capable of communicating data. Therefore, the primary port 49 is disabled even though it is possible to communicate data across the bonding group 14. As will described in more detail hereafter, disabling the primary port 49 by the LSA logic 63 signals to the switching element 45 that the data stream currently being forwarded to the primary port 49 should instead be forwarded to a backup port 71 of the NTU 37. Thus, disabling the primary port 49 effectively switches communication of such data stream from the primary bonding group 14 to the backup bonding group 33.

In this regard, the NTU 37 comprises a plurality of transceivers 77 that are respectively coupled to the subscriber lines 32 of the backup bonding group 33. In one exemplary embodiment, the transceivers 77 communicate across the subscriber lines 32 according to DSL modulation formats, such as ADSL, HDSL, VDSL, or other types of DSL formats, but modulation formats other than DSL may be employed in other embodiments.

For each data packet received by the bonding engine 74 from the switching element 45, the bonding engine 74 is configured to fragment the packet into a plurality of fragments and to then forward the fragments to a plurality of the transceivers 77 such that each fragment is received by a different transceiver 77. Each transceiver 77 receiving a fragment modulates a carrier signal with the fragment to form a modulated signal that is transmitted across the subscriber line 32 coupled to such transceiver 77. Thus, each fragment is communicated across a respective subscriber line 32, and a plurality of the subscriber lines 32 carry the fragments of the same packet.

As described above, the switching of communication from the primary bonding group 14 to the backup bonding group 33 occurs when the primary port 49 is disabled. In particular, the switching element 45 is configured to monitor the transmissions from the primary port 49 and to detect the heartbeat pulses transmitted from the primary port 49 when such port 49 is enabled. The switching element 45 then performs a backup switch from the primary port 49 to the backup port 71 when it stops receiving heartbeat pulses from the primary port 49 for at least a specified amount of time. In one exemplary embodiment, the switching element 45 tracks the amount of time since receiving the last heartbeat pulse from the primary port 49. If such amount of time exceeds a threshold, the switching element 45 initiates a backup switch to the backup port 71. Thus, the switching element 45 begins transmitting to the backup port 71 the data stream previously transmitted to the primary port 49 such that this data stream is communicated across the backup bonding group 33. In other embodiments, other techniques for determining when the primary port 49 is disabled and/or for deciding when to initiate the backup switch are possible.

In one exemplary embodiment, as will be described in more detail hereafter, the functionality of the LSA logic 63 can be selectively disabled via user input (e.g., during provisioning). When the LSA logic 63 is so disabled, the LSA logic 63 is configured to continuously enable the primary port 49 regardless of the communication performance of the primary bonding group 14. In such case, a backup switch to the backup bonding group 33 is not initiated by the LSA logic 63.

Figure 3:
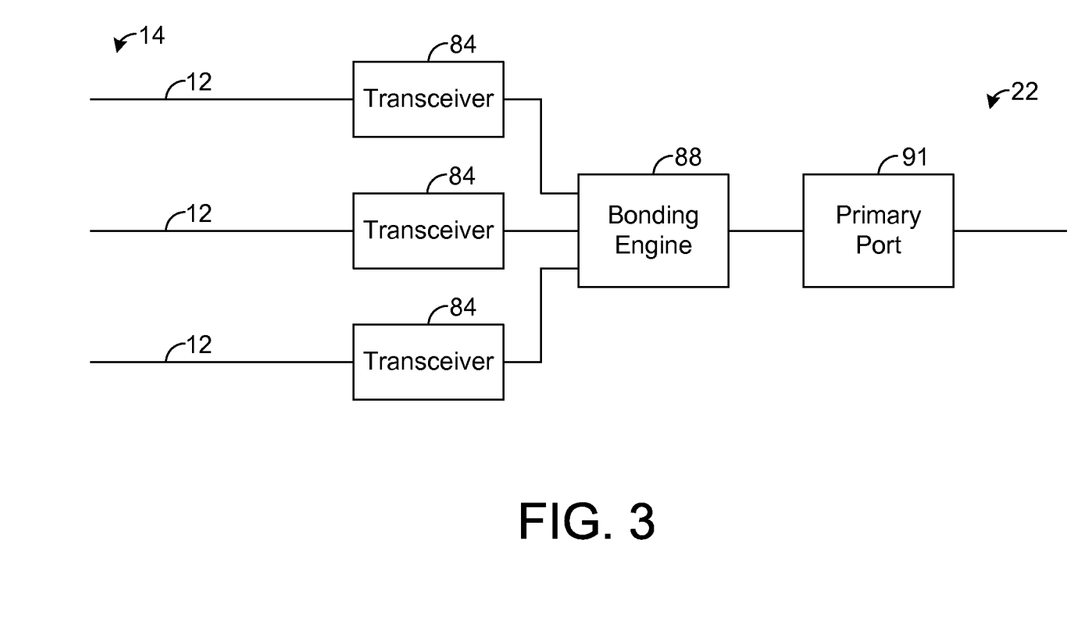
FIG. 3 is a block diagram illustrating an exemplary embodiment of a network access device, such as is depicted by FIG. 1.

FIG. 3 depicts an exemplary embodiment of the network access device 22. As shown by FIG. 3, the network access device 22 comprises a plurality of transceivers 84 respectively coupled to the subscriber lines 12. The transceivers 84 communicate across the subscriber lines 12 using the same modulation formats and protocols as the transceivers 55 (FIG. 2). Thus, in one exemplary embodiment, the transceivers 84 communicate across the subscriber lines 12 according to DSL modulation formats, but modulation formats other than DSL may be employed in other embodiments.

As described above, the signals received by the transceivers 84 from the subscriber lines 12 carry fragments of data packets fragmented by the bonding engine 52 (FIG. 2). The transceivers 84 demodulate such signals and transmit the fragments to a bonding engine 88, which reassembles the fragments to recover the data packets originally fragmented by the bonding engine 52. The data packets are then transmitted to the network 31 (FIG. 1).

In the downstream direction, the bonding engine 88 receives, from the network 31 (FIG. 1), data packets destined for the CPE 15 (FIG. 1). The bonding engine 88 is configured to fragment each such packet into a plurality of fragments and to then forward the fragments to the transceivers 84 such that each fragment is received by a different transceiver 84. Each transceiver 84 receiving a fragment modulates a carrier signal with the fragment to form a modulated signal that is transmitted across the subscriber line 12 coupled to such transceiver 84. Thus, each fragment is communicated across a respective subscriber line 12, and a plurality of the subscriber lines 12 carry the fragments of the same packet.

In one exemplary embodiment, the network access device 38 is configured similar to the network access device 22 of FIG. 3 and data is processed in a similar manner by the network access device 38. However, as previously noted, it is unnecessary for the structure and the communication techniques for the backup channel to be similar to those for the primary channel. In fact, the backup channel may be provided by a network service provider different than the one that provides the primary channel.

Note that there are various types of communication performance parameters that may be monitored by the LSA logic 63 to determine when to initiate a backup switch. For example, in one exemplary embodiment, the LSA logic 63 is configured to determine the number of subscriber lines 12 of the primary bonding group that are active and to compare such number to a predefined threshold. If the number falls below the threshold, then the LSA logic 63 initiates a backup switch by disabling the primary port 49. As described above, when the primary port 49 is disabled, the switching element 45 switches the transmission of data packets from the primary port 49 to the backup port 71, thereby switching communication from the primary bonding group 14 to the backup bonding group 33.

In the embodiment shown by FIG. 2, the LSA logic 63 is coupled to each transceiver 55 and communicates with each transceiver 55 to learn which subscriber lines 12 are active. In this regard, each transceiver 55 is configured to determine whether or not its respective subscriber line 12 is active based on whether it is currently able to communicate data across it. When a transceiver 55 is unable to maintain a certain data rate established during training, it stops communicating data and attempts to perform a retrain to find a rate that is conducive to the current conditions of its subscriber line 12. While attempting to retrain, no data is being communicated, and its subscriber line 12 therefore is inactive. Moreover, each transceiver 55 is configured to inform the LSA logic 63 whether or not its respective subscriber line 12 is active, and the LSA logic 63 is configured to determine the total number of transceivers 55 that are active based on the information provided to it by the transceivers 55.

Note that there are other reasons why a transceiver 55 may stop communicating data, thereby transitioning its subscriber line 12 into an inactive state. For example, in one exemplary embodiment, each transceiver 55 is configured to monitor a communication performance parameter, such as signal-to-noise-ratio (SNR), indicative of the quality of signals propagating across its subscriber line 12. If such parameter falls below a threshold for a given transceiver 55, such transceiver 55 is configured to stop transmitting data and attempt a retrain. There are yet other techniques for determining when a transceiver 55 should stop transmitting data.

Note that when a subscriber line 12 transitions to an inactive state, the aggregate data rate provided by the primary bonding group 14 decreases. In one exemplary embodiment, the LSA logic 63 is configured to calculate the total data rate provided by the primary bonding group 14 based on information received from the transceivers 55. In this regard, each transceiver 55 is configured to transmit to the LSA logic 63 information indicative of its current transmission rate across its respective subscriber line 12. The LSA logic 63 then sums the data rates reported by the transceivers 55 to determine the aggregate data rate for the primary bonding group 14. The LSA logic 63 then compares the aggregate data rate to a predefined threshold. If the aggregate data rate is less than the threshold, the LSA logic 63 is configured to disable the primary port 49 causing communication to switch from the primary bonding group 14 to the backup bonding group 33.

In another exemplary embodiment, each transceiver 55 is configured to count transmission errors for its respective subscriber line 12 over a defined time period to determine an error rate for the subscriber line 12. The transceiver 55 then reports data indicative of the error count or error rate to the LSA logic 63. Based on such information, the LSA logic 63 determines a value indicative of the transmission errors occurring across all of the subscriber lines 12 of the primary bonding group 14 during a certain time frame. As an example, the LSA logic 63 may be configured to sum the error counts received from the transceivers 55 to determine a total number of transmission errors that occurred for the bonding group 14 during a certain time period. In another example, the LSA logic 63 receives an error rate from each transceiver 55 and averages the error rates to determine an average error rate for the bonding group 14. In either example, the LSA logic 63 compares the calculated value (e.g., total number of errors or average error rate) to a predefined threshold. If the calculated value is greater than the threshold, the LSA logic 63 is configured to disable the primary port 49 causing communication to switch from the primary bonding group 14 to the backup bonding group 33.

In yet another exemplary embodiment, each transceiver 55 calculates the SNR for its respective subscriber line 12 and reports the SNR to the LSA logic 63, which averages the received SNR values to determine an average SNR value for the primary bonding group 14. If the average SNR value is below a predefined threshold, the LSA logic 63 is configured to disable the primary port 49 causing communication to switch from the primary bonding group 14 to the backup bonding group 33.

In other embodiments, the LSA logic 63 may monitor other parameters or utilize other techniques for determining when to disable the primary port 49 and, therefore, initiate a backup switch from the primary bonding group 14 to the backup bonding group 33. In one exemplary embodiment, the LSA logic 63 is configured to monitor a plurality of communication performance parameters and to disable the primary port 49 if any one or, in another embodiment, a certain combination of the parameters fall below a threshold level or threshold levels. As an example, the LSA logic 63 may be configured to monitor the number of active subscriber lines 12 in the bonding group 14, the average error rate for the subscriber lines 12 of the bonding group 14, and the aggregate data rate for the bonding group 14 and to disable the primary port 49 if any of the monitored parameters passes a respective threshold for that parameter.

Note that the LSA logic 63 and the bonding engines 52 and 74 can be implemented in hardware, software, firmware, or any combination thereof. Further, the transceivers 55 and 77 can be implemented in hardware or a combination of hardware with software and/or firmware. In one exemplary embodiment, the LSA logic 63 is implemented in software, and the bonding engines 52 and 74 are each implemented as a field programmable gate array (FPGA). In such an embodiment, the CPE 15 comprises at least one digital signal processor (DSP) (not show) or other instruction execution apparatus for storing and executing the LSA logic 63. However, other configurations are possible in other embodiments.

An exemplary operation and use of the communication system 10 will now be described below with particular reference to FIG. 4.

Initially, the switching element 45 (FIG. 2) is configured to forward the data stream from the residential gateway 42 to the primary port 45. Thus, the data packets of the data stream are fragmented by the bonding engine 52 and transmitted across the primary bonding group 14.

Figure 4:
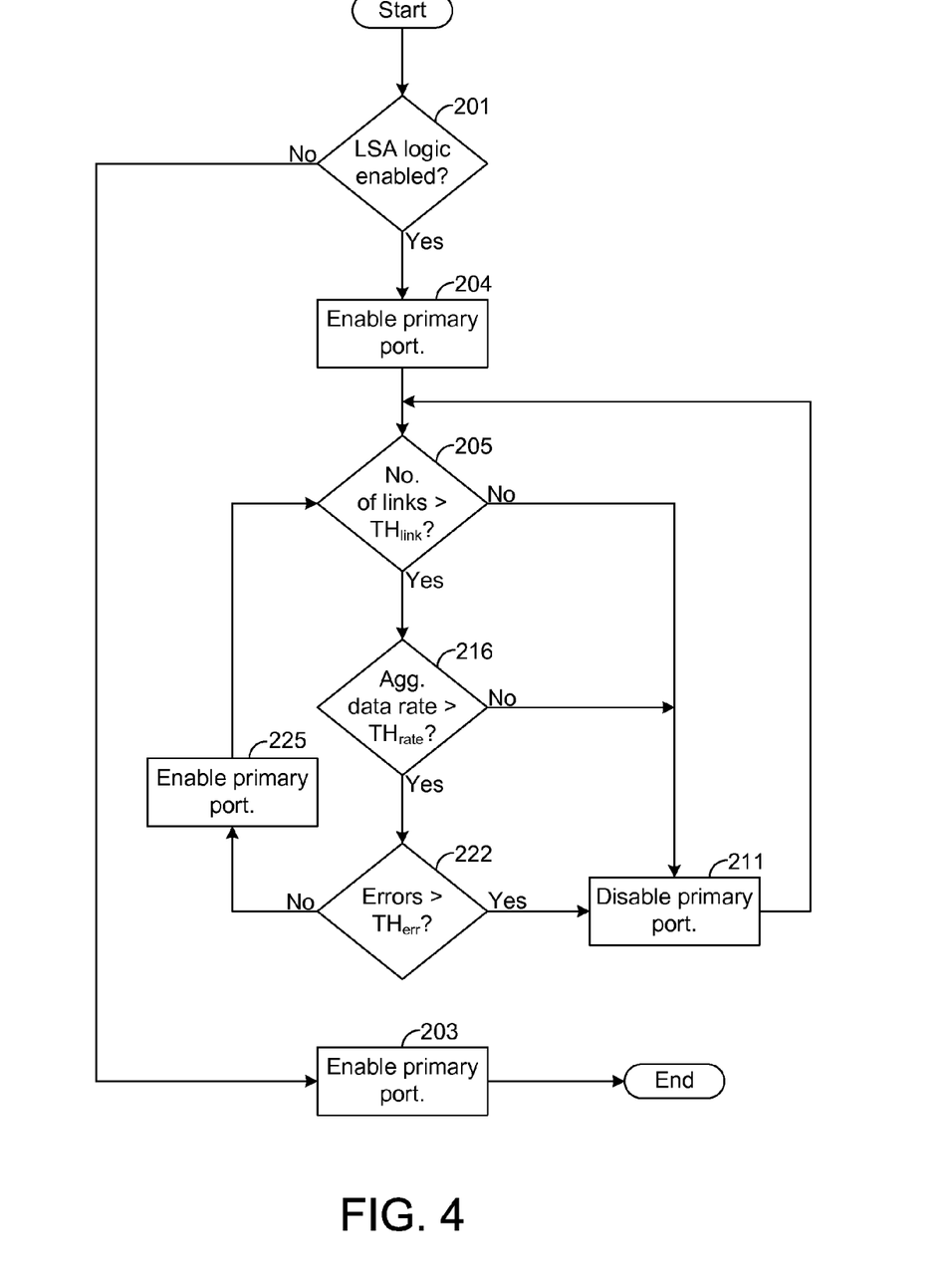
FIG. 4 is a flow chart illustrating an exemplary method for controlling a primary port, such as is depicted by FIG. 2, based on communication performance parameters for a bonding group coupled to such port.

As shown by block 201 of FIG. 4, the LSA logic 63 determines whether it is enabled. In this regard, a user may disable the LSA algorithm during provisioning by setting a control value stored in a register 202 (FIG. 2) or other type of memory device. The LSA logic 201 is configured to check such control value to determine whether it is enabled in block 201. If the control value indicates that the LSA logic 63 is disabled, the LSA logic 63 does not monitor the performance of the primary bonding group 14 and continuously enables the primary port 49, as shown by block 203, without attempting to disable the primary port 49. If the control value indicates that the LSA logic 63 is enabled, then the LSA logic 63 monitors the performance of the primary bonding group 14 and initiates a backup switch to the backup bonding group 33 when the communication performance of the primary bonding group falls below a threshold level or otherwise is within a specified range, as will be described in more detail below.

In this regard, the LSA logic 63 initially enables the primary port 49, as shown by block 204, so that data may pass through the primary port 49 between the switching element 45 and the bonding engine 52. As shown by block 205 of FIG. 4, the LSA logic 63 determines the total number of subscriber lines 12 that are active based on information from the transceivers 55, and compares such number to a threshold ($TH_{link}$). If the number does not exceed $TH_{link}$, the LSA logic 63 disables the primary port 49, as shown by block 211. If the number of active subscriber lines 12 is greater than or equal to $TH_{link}$, then the LSA logic 63 calculates the aggregate transmission rate for the bonding group 14 based on information from the transceivers 55. In this regard, each transceiver 55 informs the LSA logic 63 its rate for transmitting data across the subscriber line 12 coupled to it, and the LSA logic 63 sums such rates to determine the aggregate transmission rate for the bonding group 14. The LSA logic 63 then compares the aggregate transmission rate to a threshold ($TH_{rate}$), as shown by block 216.

If the aggregate transmission rate does not exceed $TH_{rate}$, the LSA logic 63 disables the primary port 49, as shown by block 211. If the aggregate transmission rate is greater than or equal to $TH_{rate}$, then the LSA logic 63 calculates the total number of transmission errors that occurred for the primary bonding group 14 during a certain time period based on information from the transceivers 55. The LSA logic 63 then compares the total number of errors to a threshold ($TH_{err}$), as shown by block 222. If the number exceeds $TH_{err}$, the LSA logic 63 disables the primary port 49, as shown by block 211. If the total number of errors is less than or equal to $TH_{err}$, then the LSA logic 63 continues to enable the primary port 49, as shown by block 225 and returns to block 205 to continue monitoring the performance of the primary bonding group 14.

If the primary port 49 is disabled via block 211, the LSA logic 63 returns to block 205 and continues monitoring the primary bonding group 14. If the monitored performance improves such that a "no" determination is ultimately made in block 222, the LSA logic 63 enables the primary port 49, as shown by block 225. At such point, the switching element 45 detects heartbeat pulses from the primary port 49 and, in response, switches communication from the backup bonding group 33 to the primary bonding group 14. Thus, the switching element 45 switches the data stream back to the primary port 49 from the backup port 71.

Now, therefore, the following is claimed:

1. A communication system, comprising:
   plurality of subscriber lines;
   a first network termination unit (NTU) having a port, a plurality of transceivers, and a bonding engine, the plurality of transceivers coupled to the plurality of subscriber lines, the bonding engine configured to bond the plurality of subscriber lines thereby forming a bonding group, wherein the bonding engine is configured to receive a data packet from the port and to fragment the data packet into a plurality of fragments, the bonding engine further configured to transmit the fragments to the plurality of transceivers such that the fragments are transmitted by the plurality of transceivers across the plurality of subscriber lines, wherein the first NTU further comprises logic configured to determine a parameter indicative of a communication performance of the bonding group, wherein the determined parameter is based on a communication performance of each of the plurality of subscriber lines in the bonding group, and wherein the first NTU is configured to disable the port based on the parameter when at least one of the plurality of subscriber lines is active;
   a switching element configured to receive a data stream and to forward the data stream to the port, wherein the data stream comprises the data packet; and
   a second NTU having a port and at least one transceiver coupled to at least one subscriber line,
   wherein the switching element is configured to switch the data stream from the port of the first NTU to the port of the second NTU such that data packets of the data stream are transmitted across the at least one subscriber line coupled to the second NTU when the port of the first NTU is disabled by the logic.

2. The system of claim 1, wherein the logic is configured to perform a comparison between the parameter and a threshold and to disable the port of the first NTU based on the comparison.

3. The system of claim 1, wherein the parameter is indicative of an aggregate data rate of the bonding group.

4. The system of claim 3, wherein the logic is configured to compare the parameter to a first threshold.

5. The system of claim 4, wherein the logic is configured to determine a second parameter indicative of an amount of errors detected for each of the plurality of subscribers in the bonding group and to compare the second parameter to a second threshold.

6. The system of claim 5, wherein the logic is configured to determine a third parameter indicative of a total number of active subscriber lines within the bonding group and to compare the third parameter to a third threshold.

7. The system of claim 1, wherein the parameter is based on a signal-to-noise ratio of at least one of the plurality of subscriber lines.

8. The system of claim 1, wherein the parameter is based on a data rate of at least one of the plurality of subscriber lines.

9. The system of claim 1, wherein the parameter is indicative of a total number of active subscriber lines within the bonding group.

10. The system of claim 1, wherein the parameter is based on an error rate for at least one of the plurality of subscriber lines.

11. The system of claim 1, wherein the logic is configured to communicate with each of the plurality of transceivers and to determine the parameter based on information from each of the plurality of transceivers.

12. The system of claim 1, wherein the port of the first NTU is configured to transmit heartbeat pulses to the switching element when enabled and to refrain from transmitting heartbeat pulses to the switching element when disabled, and wherein the switching element is configured switch the data stream from the port of the first NTU to the port of the second NTU based on whether the switching element receives a heartbeat pulse from the port of the first NTU within a particular time period.

13. The system of claim 1, wherein the first NTU is configured to determine the parameter by aggregating a plurality of values, each of the values indicative of a communication performance of a respective one of the plurality of subscriber lines in the bonding group.

14. A communication method, comprising:
   receiving a data stream at a port of a first network termination unit (NTU), the data stream comprising a data packet;
   bonding a plurality of subscriber lines thereby forming a bonding group, the bonding comprising fragmenting the data packet into a plurality of fragments and transmitting the fragments to a plurality of transceivers of the first NTU coupled to the plurality of subscriber lines such that the fragments are transmitted by the plurality of transceivers across the plurality of subscriber lines;
   determining a parameter indicative of a communication performance of the bonding group, wherein the determined parameter is based on a communication performance of each of the plurality of subscriber lines in the bonding group;
   disabling the port of the first NTU based on the parameter when at least one of the plurality of subscriber lines is active; and
   switching the data stream from the port of the first NTU to a port of a second NTU such that data packets of the data stream are transmitted across at least one subscriber line coupled to the second NTU in response to the disabling.

15. The method of claim 14, further comprising comparing the parameter and a threshold, wherein the disabling is based on the comparing.

16. The method of claim 14, wherein the parameter is indicative of an aggregate data rate of the bonding group.

17. The method of claim 14, wherein the parameter is based on a signal-to-noise ratio of at least one of the plurality of subscriber lines.

18. The method of claim 14, wherein the parameter is based on a data rate of at least one of the plurality of subscriber lines.

19. The method of claim 14, wherein the parameter is indicative of a total number of active subscriber lines within the bonding group.

20. The method of claim 14, wherein the parameter is based on an error rate for at least one of the plurality of subscriber lines.

21. The method of claim 14, further comprising receiving information from each of the transceivers, wherein the determining is based on the information received from each of the transceivers.

22. The method of claim 14, further comprising:
   transmitting heartbeat pulses from the port of the first NTU; and
   stopping the transmitting in response to the disabling, wherein the switching is based on the heartbeat pulses.

* * * * *